UNITED STATES PATENT OFFICE.

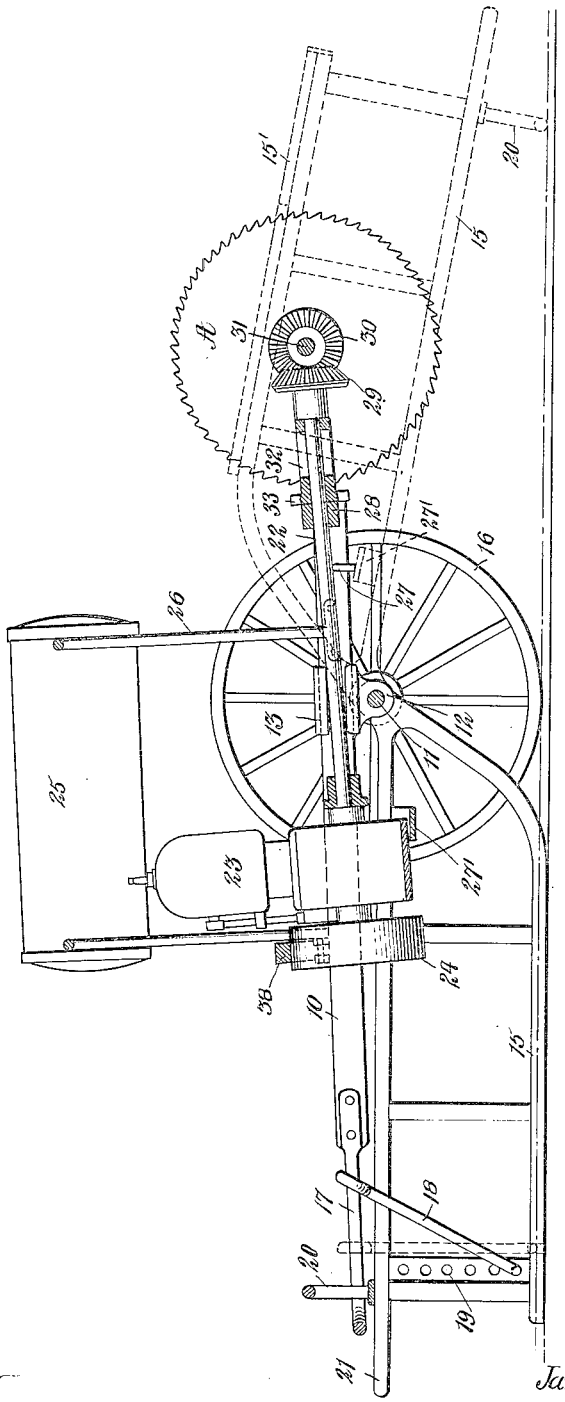

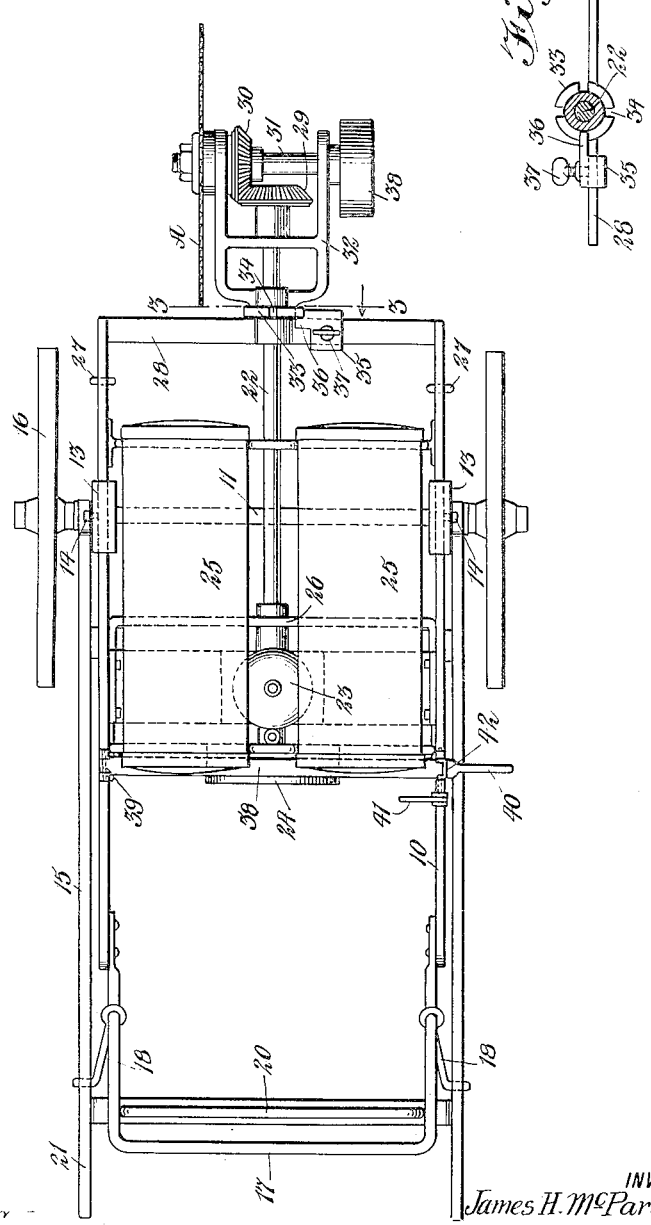

JAMES H. McPARTLAND, OF HOULTON, MAINE.

SAWING-MACHINE.

1,336,365.  Specification of Letters Patent.  Patented Apr. 6, 1920.

Application filed January 10, 1919. Serial No. 270,543.

*To all whom it may concern:*

Be it known that I, JAMES H. McPART-LAND, a citizen of the United States, and a resident of Houlton, in the county of Aroostook and State of Maine, have invented a new and Improved Sawing-Machine, of which the following is a description.

My invention relates to portable sawing machines, and more particularly to a sawing machine adapted to be employed in felling trees and cutting the same into cord lengths or stove lengths.

The general object of the invention is to provide a sawing machine having a novel construction and arrangement of parts, whereby certain advantages and new results are obtained, among which are the following:—A frame is provided and mounted to have rockable or sliding movement to vary the general position of the saw for cutting the tree close to the ground or at a distance from the ground as conditions may require; the saw arbor is so mounted relatively to its drive shaft as to permit of the saw arbor being turned through an angle or a complete circle if desired, about the axis of the drive shaft for disposing the saw to turn in a horizontal plane for felling the tree or in a vertical plane for cutting the logs into cord lengths or stove lengths; the frame is rockable about an axle and a sled is provided, the front end of which is loose on the axle, whereby the sled may be swung approximately 180° by lifting the machine from the ground to position the sled inverted adjacent to the saw to provide a saw table for cutting up logs into stove lengths for example; also, the axle is adapted to receive running wheels, and the arrangement is such that the machine may be run on the sled runners with the wheels slightly off the ground or the machine may be tilted to raise the sled runners from the ground and for running the machine on the wheels.

Reference is to be had to the accompanying drawings forming a part of this specification, it being understood that the drawings are merely illustrative of one example of the invention.

Figure 1 is a longitudinal vertical section of a sawing machine embodying my invention;

Fig. 2 is a plan view;

Fig. 3 is a detail in transverse vertical section on the line 3—3, Fig. 2.

In carrying out my invention, a frame 10 is provided, having side bars and these are rockably mounted on an axle 11 through the medium of brackets 12 on said axle and formed with slideways 13 in which the side bars of the frame 10 may have longitudinal sliding movement while the frame and brackets may rock vertically through an angle with the axle 11 as a center. Set screws 14 are provided in the brackets 12 to hold the frame 10 in any given longitudinal adjustment in the slideways 13.

The sled 15 is loosely hung at its front end on the axle 11 and said axle also may have wheels 16 of such a diameter that with the runners of the sled 15 squarely on the ground, the wheels 16 will be slightly off the ground so that the machine may travel entirely on the sled, whereas a forward tilting of the frame and sled to lift the latter will permit the machine to travel on the wheels 16. The frame 10 has a U-shaped handle 17 at its rear end and connecting the side bars of said frame as one means for conveniently rocking or sliding the frame. Suitable means is provided to latch the frame 10 to the sled, there being shown depending latches 18 loose on the sides of the handle 17 and adapted by their hooked ends to engage in any one of a vertical series of holes 19 in the sled at each side near the rear end. Similarly, the sled has an arched handle 21 at the top near the rear end and rearwardly projecting handle arms 21ª. The sled may be inverted by swinging it through an angle of approximately 180° to position it adjacent to the saw A as indicated in dotted lines in Fig. 1, in which position of the sled it will support a plank 15' or the like, whereby the sled will constitute a table useful in sawing logs up into stove lengths, the arched handle 21 constituting a leg or rest for the inverted sled. In the inverted position of the sled also the depending latches 18 may be utilized as legs for supporting the rear end of the frame 10. The movement of the sled 15 about the axle 11 in inverting the sled is limited by suitable stops, there being indicated for the purpose depending stop members 27 on the side bars of the frame 10 with which stops a cross bar 27' is adapted to contact.

The drive shaft 22 of the machine extends longitudinally of the machine and may be driven in any suitable manner, there being conventionally indicated a motor 23, the numeral 24 indicating a flywheel on the shaft 22, while 25 indicates overhead tanks to hold gasolene or the one gasolene and the other water if desired, said tanks resting in the frame 26 rising from the frame 10.

The front end of the shaft 22 has a bearing in and extends forwardly beyond the front cross bar 28 of the frame 10 and is provided with a beveled pinion 29 meshing with a corresponding pinion 30 on the transverse arbor 31 carrying the saw A. Said arbor 31 has bearings in a frame 32 which is swiveled on the front end of the shaft 22 to adapt said frame to be turned about the drive shaft 22 for disposing the saw A to revolve in a horizontal plane for felling a tree or in a vertical plane for sawing the tree up into the desired lengths. In order to lock the frame 22 in any given adjustment of the saw A, a disk 33 rigid with said frame is provided with a series of notches 34, either of which is adapted to receive a lip 36 on a latch 35 which is slidable on the front cross bar 28. Thus, the frame 32 and the saw arbor and saw may be turned through an angle to vary the plane of rotation of the saw as may be desired and said frame then locked through the medium of the latch 35, and disk 33. Thus, in practice in felling the tree, the saw A will be disposed horizontally and the frame 10 rocked if desired to position the saw for cutting high or low. The saw may be fed forwardly in cutting by a sliding movement of the frame 10 in the slideways 13. The above described arrangement possesses the important advantage that the various adjustments of the saw arbor and saw are produced by devices involving the simplest construction, the gear elements being of the minimum number and the frame 32 with its latching means being also of extremely simple form and readily adjusted to give the saw the desired position.

The numeral 38 indicates a brake lever pivoted at one end as at 39 and ranging transversely over the flywheel 24. Said lever has a handle 40 for directly manipulating it to cause it to exert more or less braking action on the flywheel to check the engine when the machine is not sawing. A lever 41 adjacent to the handle 40 is adapted to rock a crank rod 42 bearing on said handle to actuate the brake instead of directly by said handle.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A sawing machine of the class described, including a main frame, an axle on which said frame is mounted, a saw arbor, means mounting said arbor on said frame at the front end thereof and forward of said axle, and a sled slung at its front end on said axle beneath said frame, said sled being swingable on the axle through an angle of approximately 180° to dispose the sled adjacent to the saw arbor, whereby to constitute a support for material which is to be cut.

2. A sawing machine of the class described, including a main frame, an axle on which said frame is mounted, a saw arbor, means mounting said arbor on said frame at the front end thereof and forward of said axle, a sled loosely slung at its front end on said axle to normally extend rearwardly therefrom beneath the rear portion of said frame, means to latch said sled and frame, said sled being swingable on said axle through approximately 180° to invert the sled and dispose the same adjacent to the saw arbor, to constitute a saw table, and coacting stop means on the frame and sled to determine the position of the sled when swung toward the saw arbor.

JAMES H. McPARTLAND.